(12) United States Patent
Ohnuma et al.

(10) Patent No.: US 6,375,571 B1
(45) Date of Patent: Apr. 23, 2002

(54) ENTERTAINMENT SYSTEM, ENTERTAINMENT APPARATUS, RECORDING MEDIUM, AND PROGRAM

(75) Inventors: Masaru Ohnuma; Akihiro Taguti, both of Tokyo (JP)

(73) Assignee: Sony Computer Entertaiment, Inc., Tokyo (JP)

( * ) Notice: Subject to any disclaimer, the term of this patent is extended or adjusted under 35 U.S.C. 154(b) by 0 days.

(21) Appl. No.: 09/654,105

(22) Filed: Aug. 31, 2000

(30) Foreign Application Priority Data

Sep. 2, 1999 (JP) .......................................... 11-249349

(51) Int. Cl.[7] ................................................. A63F 9/24
(52) U.S. Cl. ............................... 463/37; 463/1; 463/43; 463/7
(58) Field of Search ............................ 463/1, 9, 30, 33, 463/36, 37, 43, 44; 273/317, 317.1, 440, 441

(56) References Cited

U.S. PATENT DOCUMENTS

| | | | |
|---|---|---|---|
| 4,752,069 A | * | 6/1988 | Okada ..................... 273/1 GC |
| 5,649,861 A | * | 7/1997 | Okano et al. .................. 463/30 |
| 5,649,862 A | * | 7/1997 | Sakaguchi et al. ............ 463/44 |
| 5,752,883 A | * | 5/1998 | Butcher et al. ................ 463/43 |
| 6,168,524 B1 | * | 1/2001 | Aoki et al. ..................... 463/31 |

OTHER PUBLICATIONS

Wizards Crown Copyright 1985 by Strategic Sumulation, Inc. pp. 2, 5–7, and 10–11.*

* cited by examiner

Primary Examiner—Jessica J. Harrison
Assistant Examiner—Alex F. R. P. Rada, II
(74) Attorney, Agent, or Firm—Dergosits & Noah LLP

(57) ABSTRACT

A button icon is displayed on a display monitor for a predetermined period of time. When the button icon is displayed on a display monitor, a user successively presses a decision button. The number of times the decision button is pressed when the button icon is displayed on the display monitor is counted and inputted to an entertainment apparatus as manipulation data. Damage of a virtual enemy (e.g., monster) displayed on the display monitor changes based on the manipulation data.

14 Claims, 15 Drawing Sheets

ENTERTAINMENT SYSTEM, ENTERTAINMENT APPARATUS, RECORDING MEDIUM, AND PROGRAM

BACKGROUND OF THE INVENTION

1. Field of the Invention

The present invention relates to an entertainment system which comprises an entertainment apparatus for changing a parameter of a program presently executed by the entertainment apparatus. Further, the present invention relates to an entertainment apparatus for constituting the entertainment system, a recording medium for use of the entertainment system, and a program itself.

2. Description of the Related Art

Some entertainment systems having entertainment apparatus which include video game machines execute a game according to a game program which is read from a recording medium such as a CD-ROM or the like under the control of a manual controller while game images are being displayed on a display screen of a television receiver based on data read from the recording medium.

The entertainment apparatus and the manual controller are usually connected to each other by serial interfaces. When a clock signal is sent from the entertainment apparatus to the manual controller, the manual controller sends key switch information corresponding to manual input actions of a user in synchronism with the clock signal.

Recently, there has been developed and used a system having a manual controller which incorporates therein a vibration generating mechanism for imparting vibrations to a user in response to a request from an external drive, for example, the entertainment apparatus. While a game is in progress on the entertainment apparatus, various vibrations corresponding to manual input actions of the user are generated and imparted to the user.

In such circumstances, various types of games utilizing the above-described entertainment apparatus such as a role playing game, a shooting game, a driving game, and a fighting game are currently available on the market.

The shooting games and the fighting games are mainly directed to defeat opponents or destroy enemies by attacks. Therefore, various attacking patterns are available in most of the shooting games and the fighting games. A user can enjoy these games by selecting a suitable attacking pattern in a battle scene and executing the selected attacking pattern at the best timing for attacking opponents or enemies, while defending attacks from the opponents or the enemies.

The role playing games are mainly directed to provide a basic story through which a main character can visit a lot of places and virtually experience various events. For example, in the story, the main character explores a dungeon for defeating a boss monster or in search of a hidden treasure.

Another amusing aspect of the role playing games is to gain levels of the main character by gaining experiences through battles with monsters. The collection of gold or unique items through the battles is also an amusing aspect of the role playing games.

In most of the role playing games, when a main character gains experiences and the level of the main character goes to the next level, the main character acquires skills of weapons or magic spells. In this situation, battle scenes tend to be monotonous since animations indicating the effect of a selected weapon, a magic spell or a magic item are simply displayed on a display monitor repeatedly like a simulation game.

Further, in most of the role playing games, the effect of a magic spell or a magic item, that is, the monster's damage by the magic attack utilizing a magic spell or a magic item is predetermined. Therefore, it is not enjoyable for the user to select a magic spell or a magic item in the battle scene. The battle scene tends to be also monotonous in this sense.

SUMMARY OF THE INVENTION

It is therefore an object of the present invention to provide an entertainment system, an entertainment apparatus, a recording medium, and a program which are applicable to a role playing game and which make it possible to reflect manipulation data inputted by specific manipulation of a user on the effect of a magic spell or a magic item in a battle scene of the role playing game, thereby preventing the user from losing interest in the role playing game.

According to the present invention, an entertainment system comprises:

an entertainment apparatus for executing various programs;

at least one manual controller for inputting a manual control request of a user to the entertainment apparatus;

a display monitor for displaying an image outputted from the entertainment apparatus; and parameter changing means for permitting the user to input manipulation data by specific manipulation of the manual controller when a symbol indicating permission to input the manipulation data by the specific manipulation is displayed on the display monitor, and for changing a predetermined parameter of a program presently executed by the entertainment apparatus based on the manipulation data inputted by the specific manipulation.

Further, according to the present invention, an entertainment apparatus for executing various programs is connectable to at least one manual controller for inputting a manual control request of a user to the entertainment apparatus, and connectable to a display monitor for displaying an image outputted from the entertainment apparatus, wherein the entertainment apparatus comprises parameter changing means for permitting the user to input manipulation data by specific manipulation of the manual controller when a symbol indicating permission to input the manipulation data by the specific manipulation is displayed on the display monitor, and for changing a predetermined parameter of a program presently executed by the entertainment apparatus based on the manipulation data inputted by the specific manipulation.

Further, according to the present invention, a recording medium stores a program and data for use of an entertainment system, the entertainment system comprising:

an entertainment apparatus for executing various programs;

at least one manual controller for inputting a manual control request of a user to the entertainment apparatus; and a display monitor for displaying an image outputted from the entertainment apparatus;

wherein the program comprises the step of changing the parameter comprising the steps of:

permitting the user to input manipulation data by specific manipulation of the manual controller when a symbol indicating permission to input the manipulation data by the specific manipulation is displayed on the display monitor; and changing a predetermined parameter of a program presently executed by the entertainment apparatus based on the manipulation data inputted by the specific manipulation.

Further, according to the present invention, a program is readable and executable by a computer, the program being for use of an entertainment system comprising:

an entertainment apparatus for executing various programs;

at least one manual controller for inputting a manual control request of a user to the entertainment apparatus; and a display monitor for displaying an image outputted from the entertainment apparatus;

wherein the program comprises the steps of:

permitting the user to input manipulation data by specific manipulation of the manual controller when a symbol indicating permission to input the manipulation data by the specific manipulation is displayed on the display monitor; and changing a predetermined parameter of a program presently executed by the entertainment apparatus based on the manipulation data inputted by the specific manipulation.

In the above described invention, the specific manipulation may be performed by successively manipulating a predetermined control member multiple times. The parameter changing means (the step of changing the parameter) may comprise data entry counting means for (the step of) counting the number of times the predetermined control member is manipulated for inputting the manipulation data when the symbol is displayed on the display monitor. The parameter may be changed based on the counted number of times the predetermined control member is manipulated for inputting the manipulation data.

Further, the parameter changing means (the step of changing the parameter) may comprise parameter displaying means for (the step of) displaying a change of the parameter near the symbol on the display monitor. The parameter may indicate a degree of influence on a virtual enemy displayed on the display monitor.

Further, the parameter changing means (the step of changing the parameter) may comprise:

symbol displaying means for (the step of) displaying the symbol on the display monitor for a predetermined period of time;

data entry counting means for (the step of) counting the number of times the predetermined control member is manipulated for inputting the manipulation data when the symbol is displayed on the display monitor; and influence changing means for (the step of) changing the degree of influence on the virtual enemy based on the counted number of times the predetermined control member is manipulated for inputting the manipulation data.

For example, in a conventional battle scene of a role playing game, when a user tries to attack a monster with a magic spell or a magic item, a predetermined animation for the selected magic spell or magic item is displayed on a display monitor. Then, predetermined damage points by the magic spell or magic item are subtracted from hit points of the monster. In this case, since it is not possible for the user to input data or commands during the animation of the magic attack, the user can only passively view the progress of the animation. Therefore, the user can not feel actively participating in the battle. Therefore, the battle scene tends to be monotonous.

However, according to the present embodiment, the user is permitted to input specific manipulation data via the manual controller (for example, the user can input manipulation data by pressing the control member successively) for changing damage points of a virtual enemy (monster). Thus, it is possible for the user to actively participate in the battle. Accordingly, a further amusing aspect can be added to the role playing game.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

An embodiment of the entertainment system according to the present invention which is applied to a video game apparatus, and an embodiment of the recording medium according to the present invention which is applied to a recording medium for storing a program and data executable by the video game apparatus will be described with reference to FIGS. 1 through 15.

Figure 1:
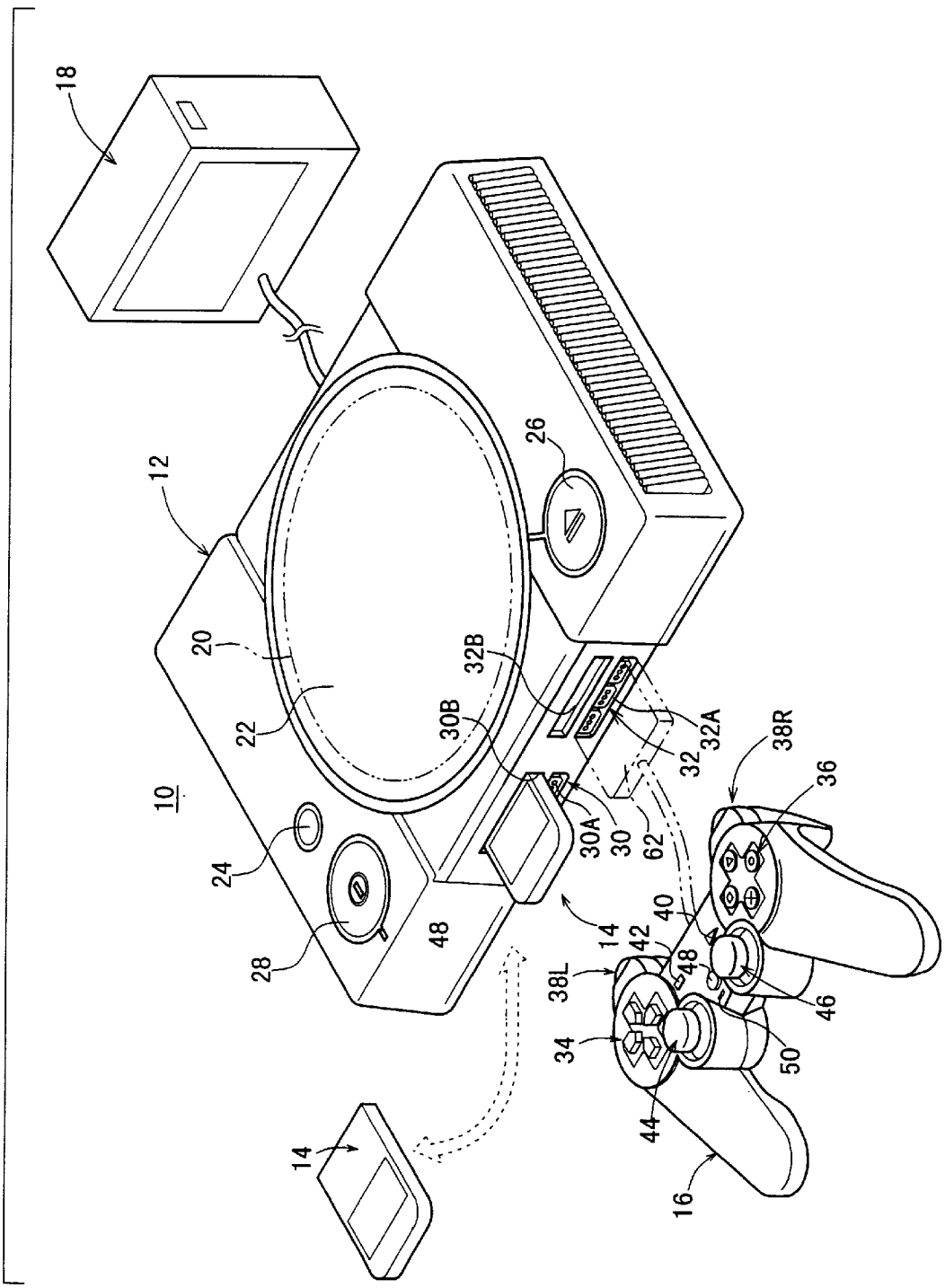
FIG. 1 is a perspective view of an entertainment system according to an embodiment of the present invention.

As shown in FIG. 1, an entertainment system 10 basically comprises an entertainment apparatus 12 for executing various programs, a memory card 14 detachably connected to the entertainment apparatus 12, a manual controller 16 detachably connected to the entertainment apparatus 12 by a connector 62, and a display monitor 18 such as a television receiver which is supplied with video and audio output signals from the entertainment apparatus 12.

The entertainment apparatus 12 reads a program recorded in a mass storage medium such as an optical disk 20 such as a CD-ROM or the like, and executes a game, for example, based on the program depending on commands supplied from a user, e.g., a game player, via the manual controller 16. The execution of the game mainly represents controlling the progress of the game by controlling the display of images and the generation of sounds on the display monitor 18 based on manual input actions entered from the manual controller 16 via the connector 62.

The entertainment apparatus 12 has a substantially flat casing in the shape of a rectangular parallelepiped which houses a disk loading unit 22 disposed centrally for loading an optical disk 20 for supplying an application program and data for a video game or the like. The casing supports a reset switch 24 for resetting a program which is being presently executed, a disk control switch 26 for controlling the loading of the optical disk 20, a power supply switch 28, and two slots 30, 32.

The entertainment apparatus 12 may be supplied with the application program via a communication link, rather than being supplied from the optical disk 20 as the recording medium.

The slots 30, 32 have respective upper slot units 30B, 32B and respective lower slots units 30A, 32A. Two manual controllers 16 may be connected respectively to the lower slots units 30A, 32A, and memory cards 14 (or unillustrated portable information terminals having the function of the memory card 14) for storing flags indicative of interim game data may be connected respectively to the upper slots units 30B, 32B. The slots 30, 32 (the upper slot units 30B, 32B and the lower slots units 30A, 32A) are asymmetrically shaped to prevent the connectors 62 and the memory cards 14 from being inserted in the wrong direction.

Figure 2:
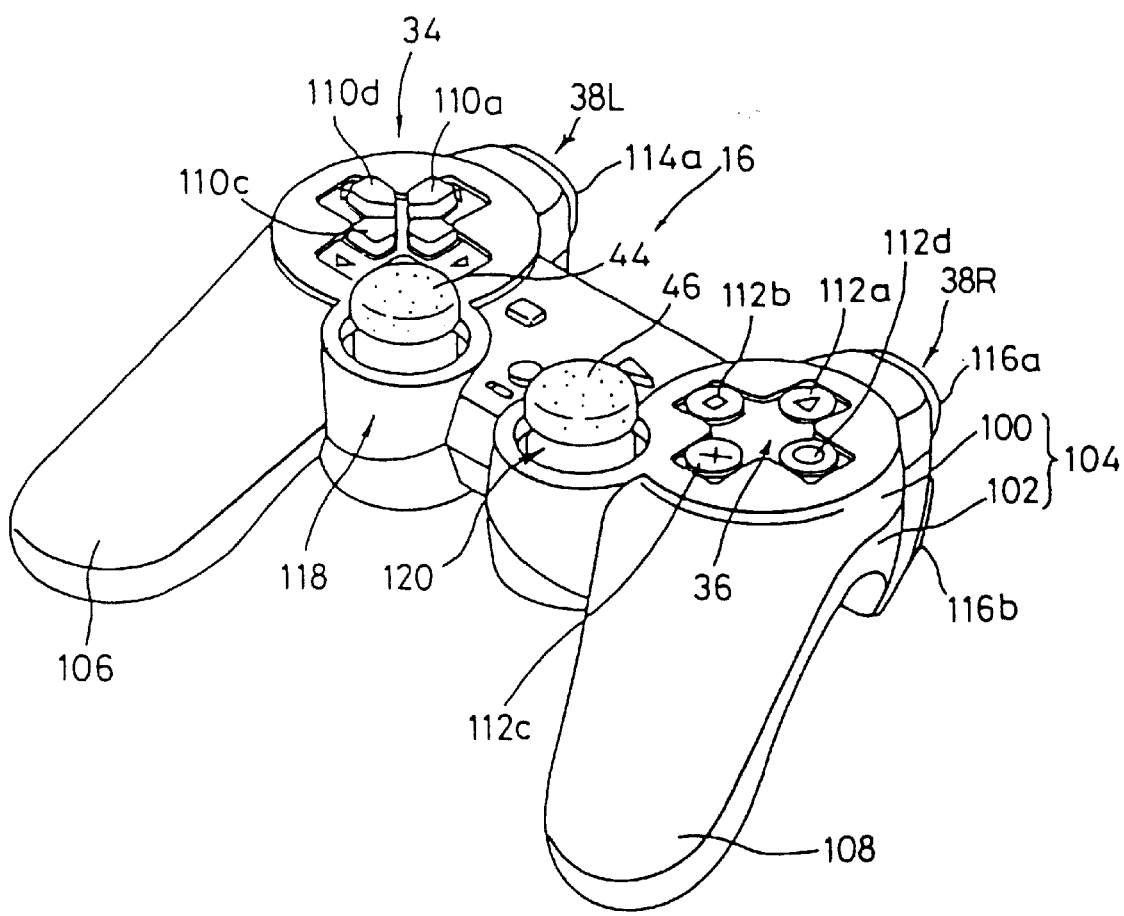
FIG. 2 is a perspective view of a manual controller.
Figure 3:
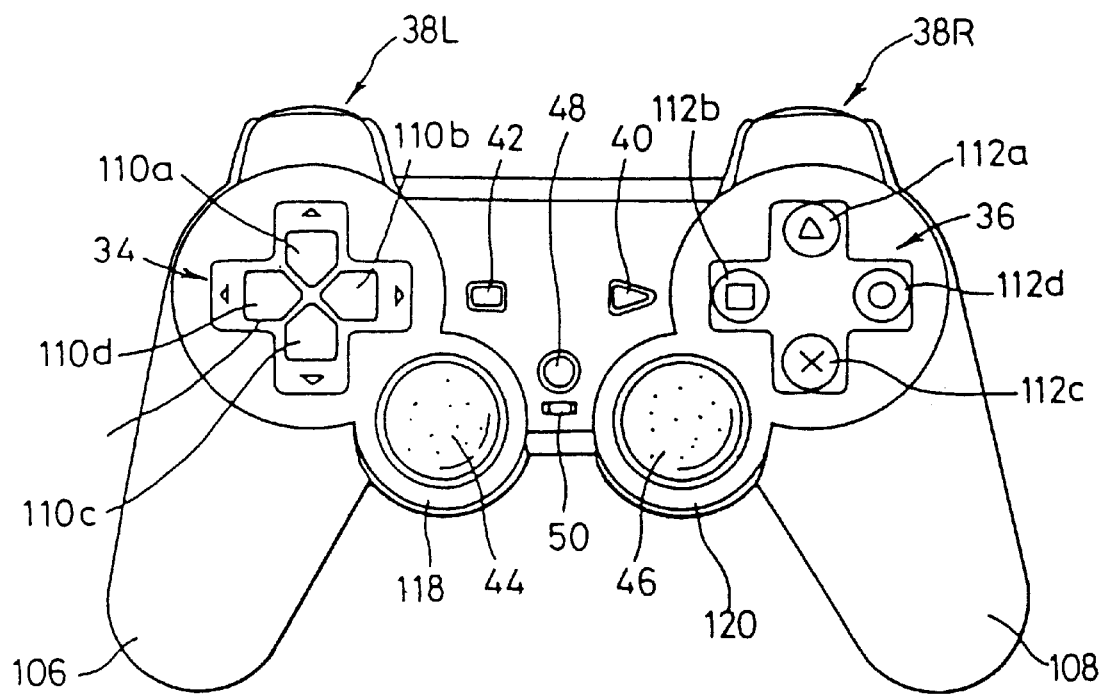
FIG. 3 is a plan view of the manual controller.

As shown in FIGS. 2 and 3, the manual controller 16 has first and second control pads 34, 36, an L (Left) button 38L, an R (Right) button 38R, a start button 40, and a selection button 42. The manual controller 16 also has joysticks 44, 46 for inputting analog control actions, a mode selection switch 48 for selecting control modes of the joysticks 44, 46, and an indicator 50 for indicating a selected control mode. The indicator 50 comprises a light-emitting element such as a light-emitting diode or the like.

As shown in FIG. 2, the manual controller 16 has a housing 104 comprising an upper member 100 and a lower member 102 which are mated and joined to each other by fasteners such as screws.

As shown in FIGS. 2 and 3, a pair of left and right grips 106, 108 projects from one side of respective opposite ends of the housing 104. The left and right grips 106, 108 are shaped so as to be gripped by the palms of left and right hands of the user or game player when the manual controller 16 is connected to the entertainment apparatus 12 and information retrieval is carried out or the game is played thereby, for example.

As shown in FIG. 3, the left and right grips 106, 108 are progressively spaced away from each other toward their distal ends. To allow the game player to grip the left and right grips 106, 108 comfortably for a long period of time, the left and right grips 106, 108 are tapered from their joint with the housing 104 toward their distal ends, and have arcuate outer peripheral surfaces and arcuate distal end surfaces.

As shown in FIGS. 2 and 3, the first control pad 34 is disposed on one end of the housing 104 and comprises a first pressable control member (up button) 110a, a second pressable control member (right button) 110b, a third pressable control member (down button) 110c, and a fourth pressable control member (right button) 110d. The first through fourth pressable control members 110a, 110b, 110c, 110d project on an upper surface of the housing 104 and are arranged in a crisscross pattern.

The first control pad 34 includes switch elements as signal input elements associated respectively with the first through fourth pressable control members 110a, 110b, 110c, 110d. The first control pad 34 functions as a directional controller for controlling the direction of movement of a displayed game character, for example. When the game player selectively presses the first through fourth pressable control members 110a, 110b, 110c, 110d to turn on or off the switch elements associated respectively with the first through fourth pressable control members 110a, 110b, 110c, 110d, the displayed game character moves in the direction corresponding to the pressed one of the first through fourth pressable control members 110a, 110b, 110c, 110d.

As shown in FIGS. 2 and 3, the second control pad 36 is disposed on the other end of the housing 104 and comprises a first pressable control member (Δ button) 112a, a second pressable control member (□ button) 112b, a third pressable control member (× button) 112c, and a fourth pressable control member (○ button) 112d. The first through fourth pressable control members 112a, 112b, 112c, 112d project on the upper surface of the housing 104 and are arranged in a crisscross pattern.

The first through fourth pressable control members 112a, 112b, 112c, 112d are constructed as independent members, and associated with respective switch elements disposed in the second control pad 36.

The second control pad 36 serves as a function setting/performing unit for setting functions for a displayed game character assigned to the pressable control members 112a–112d or performing functions of a displayed game character when the switch elements associated with the pressable control members 112a–112d are turned on.

Figure 4:
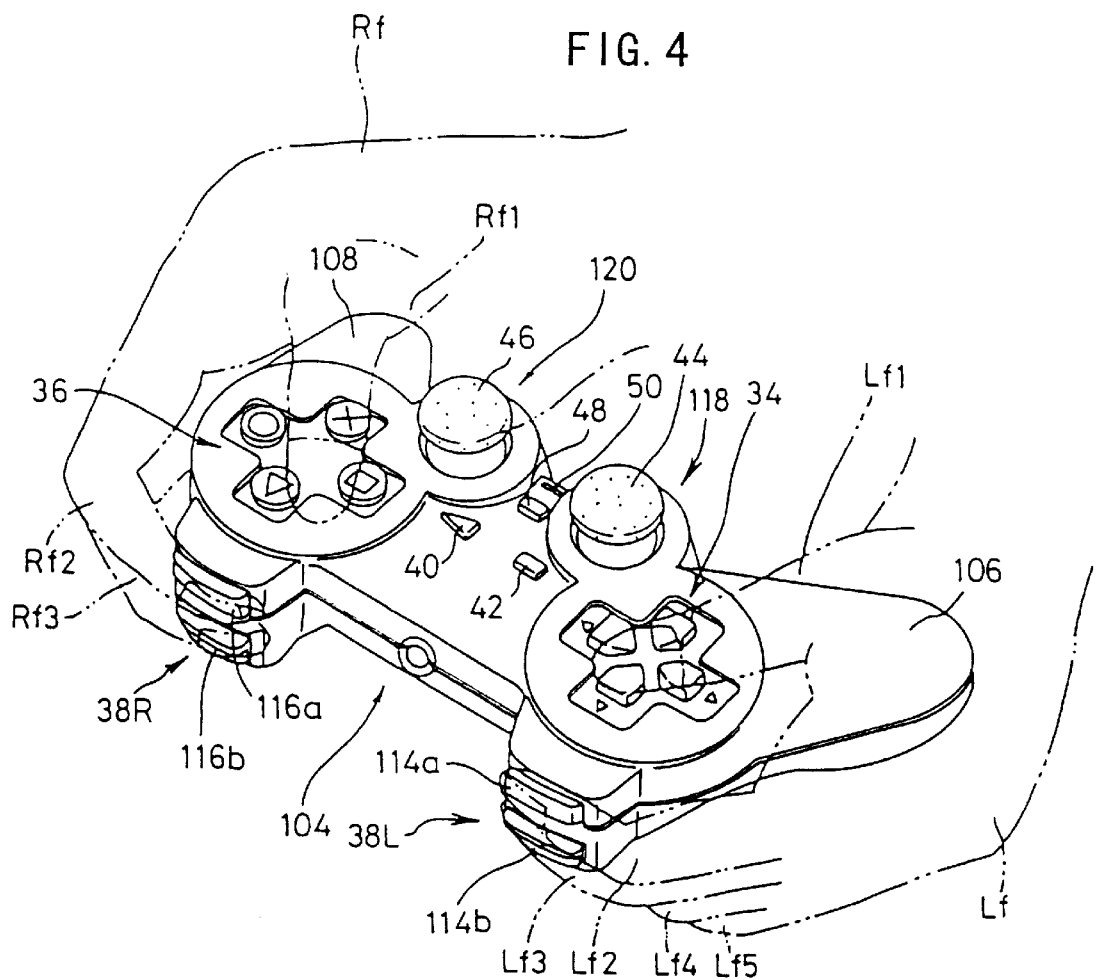
FIG. 4 is a perspective view showing a manner in which the manual controller is used.

The L button 38L and the R button 38R are disposed on a side of the housing 104 remote from the left and right grips 106, 108 and positioned respectively at the opposite ends of the housing 104. As shown in FIGS. 2 and 4, the L button 38L has a first left pressable control member (L1 button) 114a and a second left pressable control member (L2 button) 114b, and the R button 38R has a first right pressable control member (R1 button) 116a and second right pressable control member (R2 button) 116b, respectively. The L button 38L and the R button 38R have respective switch elements associated respectively with the pressable control members (the L1 button 114a, the L2 button 114b, the R1 button 116a, and the R2 button 116b).

The L button 38L and the R button 38R serve as respective function setting/performing units for setting functions for a displayed game character assigned to the pressable control members 114a, 114b and 116a, 116b or performing functions of a displayed game character when the switch elements associated with the pressable control members 114a, 114b and 116a, 116b are turned on.

As shown in FIGS. 2 and 3, the manual controller 16 also has first and second analog control pads 118, 120 disposed respectively at confronting corners defined between the housing 104 and the proximal ends of the left and right grips 106, 108 which are joined to the housing 104.

The first and second analog control pads 118, 120 have the respective joysticks 44, 46 which can be tilted in all directions (360°) about control shafts thereof, and respective signal input elements such as variable resistors or the like which are operable by the respective joysticks 44, 46. Specifically, the control shaft of the left and right joysticks 44, 46 are normally urged to return to their neutral positions by biasing members. The left and the right joysticks 44, 46 can be freely tilted in all directions (360°) about the axes of the control shafts.

The first and second analog control pads 118, 120 can move a displayed game character while rotating the same or while changing its speed, and can make an analog-like action such as to change the form of a displayed character, when the game player manipulates the joysticks 44, 46. Therefore, the first and second analog control pads 118, 120 are used as a control unit for entering command signals for a displayed character to perform the above movement or action.

When the mode selection switch 48 is pressed, it can select a control mode for allowing a command signal to be inputted from the first and second analog control pads 118, 120 or a control mode for inhibiting a command signal from being inputted from the first and second analog control pads 118, 120.

When the mode selection switch 48 is pressed, it can also select a control mode for allowing a command signal to be inputted from the first and second analog control pads 118, 120 and selecting the function of the first through fourth pressable control members 112a, 112b, 112c, 112d of the second control pad 36 or the function of the pressable control members 114a, 114b and 116a, 116b of the L button 38L and the R button 38R. Depending on the control mode selected by the mode selection switch 48, the mode indicator 50 flickers and changes its indication light.

As shown in FIG. 4, the left and right grips 106, 108 projecting from the housing 104 are gripped respectively by the palms of the hands of the game player. The housing 104 is not required to be supported by fingers, and the manual controller 16 can be held by the hands while at least six out of the ten fingers of the hands can freely be moved.

As shown in FIG. 4, when the first and second grips 106, 108 are gripped respectively by the palms of the hands of the game player, the thumbs Lf1, Rf1 of the left and right hands can extend over the joysticks 44, 46 of the first and second analog control pads 118, 120, the first through fourth pressable control members 110a–110d of the first control pad 34, and the first through fourth pressable control members 112a–112d of the second control pad 36, and can selectively press the joysticks 44, 46, the pressable control members 110a–110d, and the pressable control members 112a–112d.

Since the joysticks 44, 46 of the first and second analog control pads 118, 120 are positioned in confronting relation to the proximal ends of the left and right grips 106, 108 which are joined to the housing 104, when the left and right grips 106, 108 are gripped by the left and right hands, the joysticks 44, 46 are positioned most closely to the thumbs Lf1, Rf1, respectively. Therefore, the joysticks 44, 46 can easily be manipulated by the thumbs Lf1, Rf1.

As shown in FIG. 4, when the left and right grips 106, 108 are gripped respectively by the palms of the hands of the game player, the index fingers Lf2, Rf2 and middle fingers Lf3, Rf3 of the left and right hands can extend over positions where they can selectively press the L1 button 114a, L2 button 114b of the L button 38L and R1 button 116a, R2 button 116b of the R button 38R.

Figure 5:
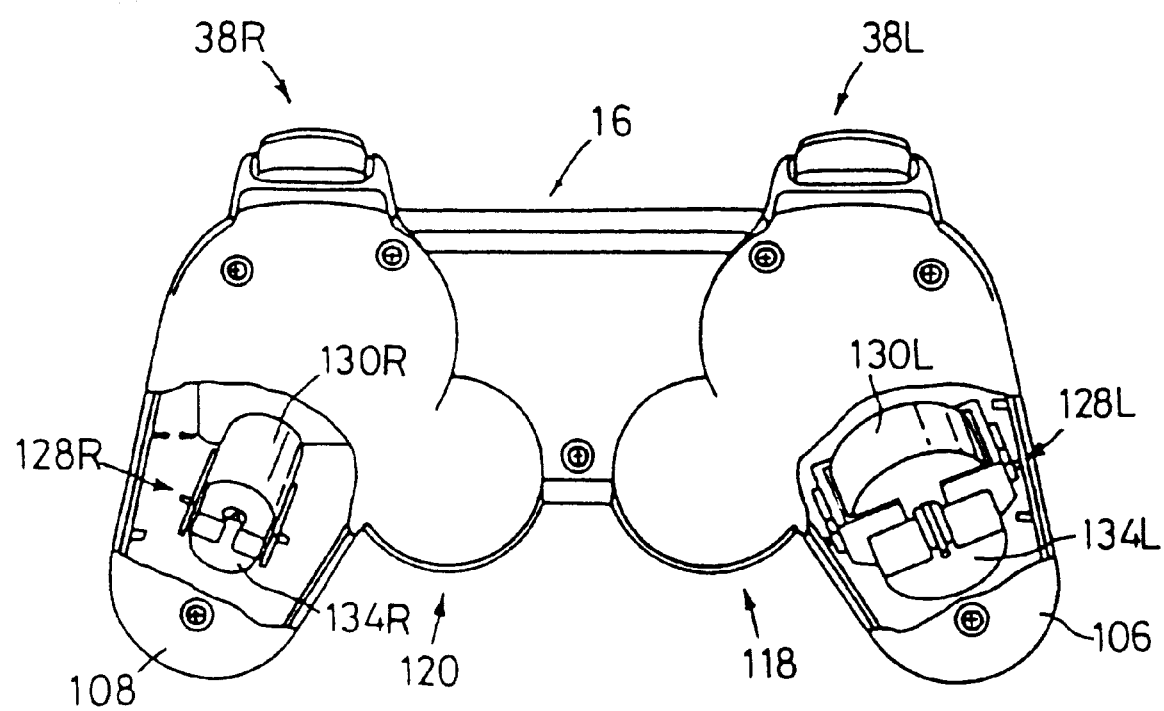
FIG. 5 is a bottom view, partly broken away, of the manual controller, showing vibration imparting mechanisms disposed respectively in left and right grips.

As shown in FIG. 5, the manual controller 16 has a pair of vibration imparting mechanisms 128L, 128R for imparting vibrations to the user in order for the user to be able to play a highly realistic game.

As shown in FIG. 5, the left and right vibration imparting mechanisms 128L, 128R are positioned near the proximal ends of the left and right grips 106, 108 that are held by the hands and fingers when the manual controller 16 is gripped by the user.

Since the both vibration imparting mechanisms 128L, 128R have basically the same structure except their vibration characteristics, only the right vibration imparting mechanism 128R will be described for the purpose of brevity.

The vibration imparting mechanisms 128R comprises a motor 130R energizable by a vibration generating command supplied from the entertainment apparatus 12, and an eccentric member 134R mounted eccentrically on the drive shaft of the motor 130R.

The eccentric member 134R comprises a weight in the form of a heavy metal member having a semicircular cross-sectional shape. The weight has an off-center hole defined therein in which the drive shaft of the motor 130R is fitted.

According to the vibration imparting mechanisms 128L, 128R as constructed above, when the motors 130L, 130R are energized, the drive shafts thereof rotate to cause the eccentric members 134L, 134R to rotate in an eccentric motion for thereby generating vibrations, which are imparted to the left grip 106 and the right grip 108. Then, the vibrations of the left grip 106 and the right grip 108 are applied to the hands and fingers of the user.

Next, the vibration characteristics of the vibration imparting mechanisms 128L, 128R disposed in the left grip 106 and the right grip 108 respectively will be described hereinbelow.

The vibration imparting mechanisms 128L, 128R have the different vibration characteristics.

For example, the motor 130L of the left vibration imparting mechanism 128L is bigger than the motor 130R of the right vibration mechanism 128R. The rotational speed of the motor 130L varies according to a vibration value included in a vibration generating command transmitted from the entertainment apparatus 12. That is, vibrations having different frequencies can be generated depending on the vibration value. In the present embodiment, the vibration frequency of the motor 130L varies in proportion to the vibration value.

In contrast to the motor 130L of the left vibration mechanism 128L, the vibration frequency of the motor 130R of the right vibration mechanism 128R does not vary according to the vibration value included in the vibration generating command. The motor 130R of the right vibration mechanism 128R is simply energized or deenergized according to the vibration value. If the vibration value (logic value) is "1", the motor 130R of the right vibration mechanism 128R is energized. If the vibration value is "0", the motor 130R of the right vibration mechanism 128R is deenergized. When the motor 130R of the right vibration mechanism 128R is energized, it rotates at a constant speed to generate vibrations at a constant frequency.

In order to energize the motors 130L, 130R to vibrate the manual controller 16 in its entirety, a bidirectional communication function needs to be provided between the manual controller 16 and the entertainment apparatus 12. This bidirectional communication function will be described later on.

Next, circuit arrangements of the entertainment apparatus 12 and the manual controller 16 will be described below with reference to FIGS. 6 through 8.

Figure 6:
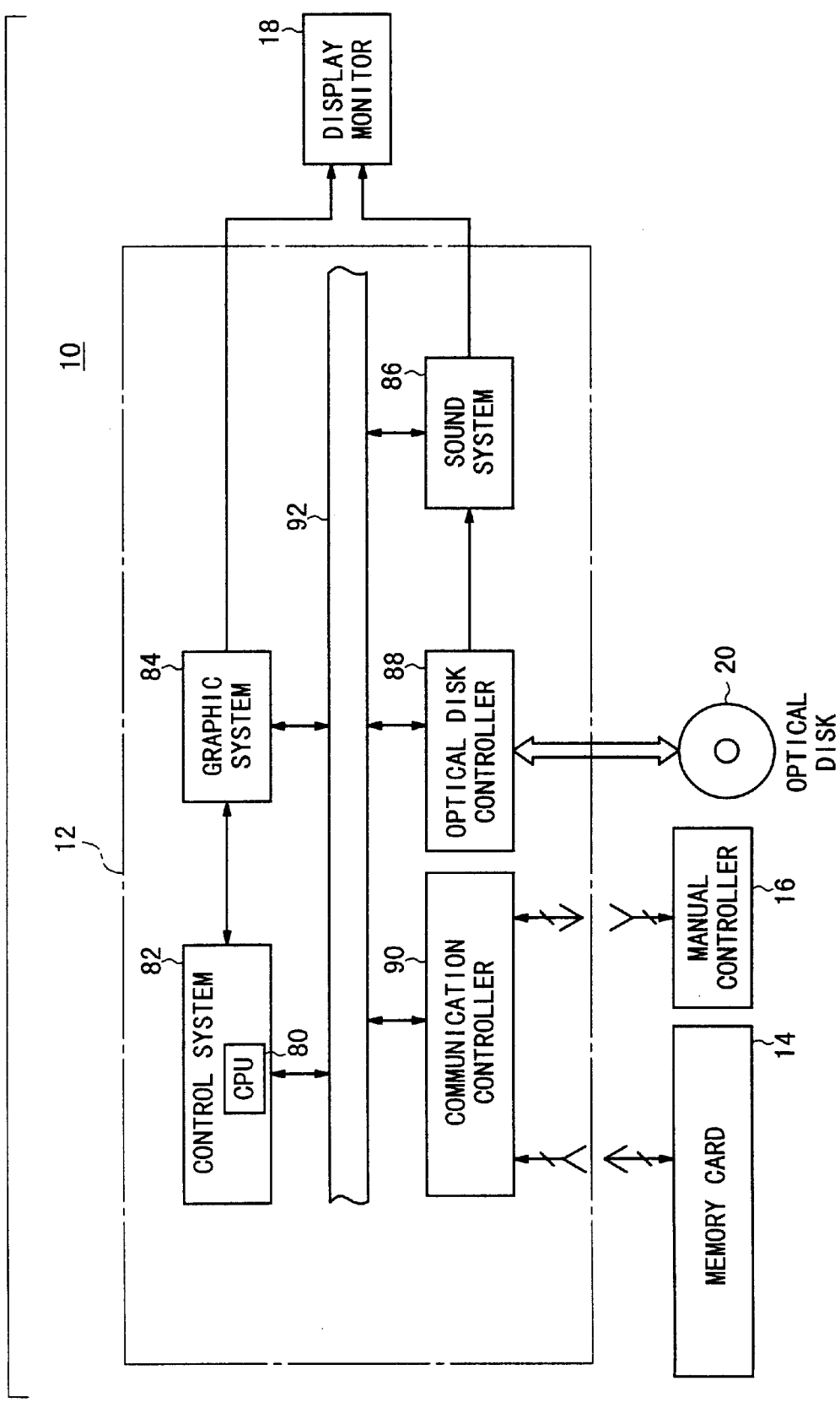
FIG. 6 is a block diagram showing a circuit arrangement of the entertainment apparatus.

As shown in FIG. 6, the entertainment apparatus 12 comprises a control system 82 including a central processing unit (CPU) 80 and peripheral devices thereof, a graphic system 84 including a frame buffer (not illustrated) and a graphic processing unit (GPU) for rendering image data in the frame buffer, a sound system 86 including a sound processing unit (SPU) for generating music sounds and sound effects, an optical disk controller 88 for controlling the readout of the optical disk 20 in which application programs and data are stored, a communication controller 90 for controlling the inputting of data into and outputting of data from the manual controller 16 and the memory card 14, and a system bus 92 to which the control system 82, the graphic system 84, the sound system 86, the optical disk controller 88, and the communication controller 90 are connected.

Video and audio signals generated by and outputted from the graphic system 84 and the sound system 86 are supplied to the display monitor 18 to display images on the monitor screen of the display monitor 18 and reproduce sounds from the speakers of the display monitor 18.

Figure 7:
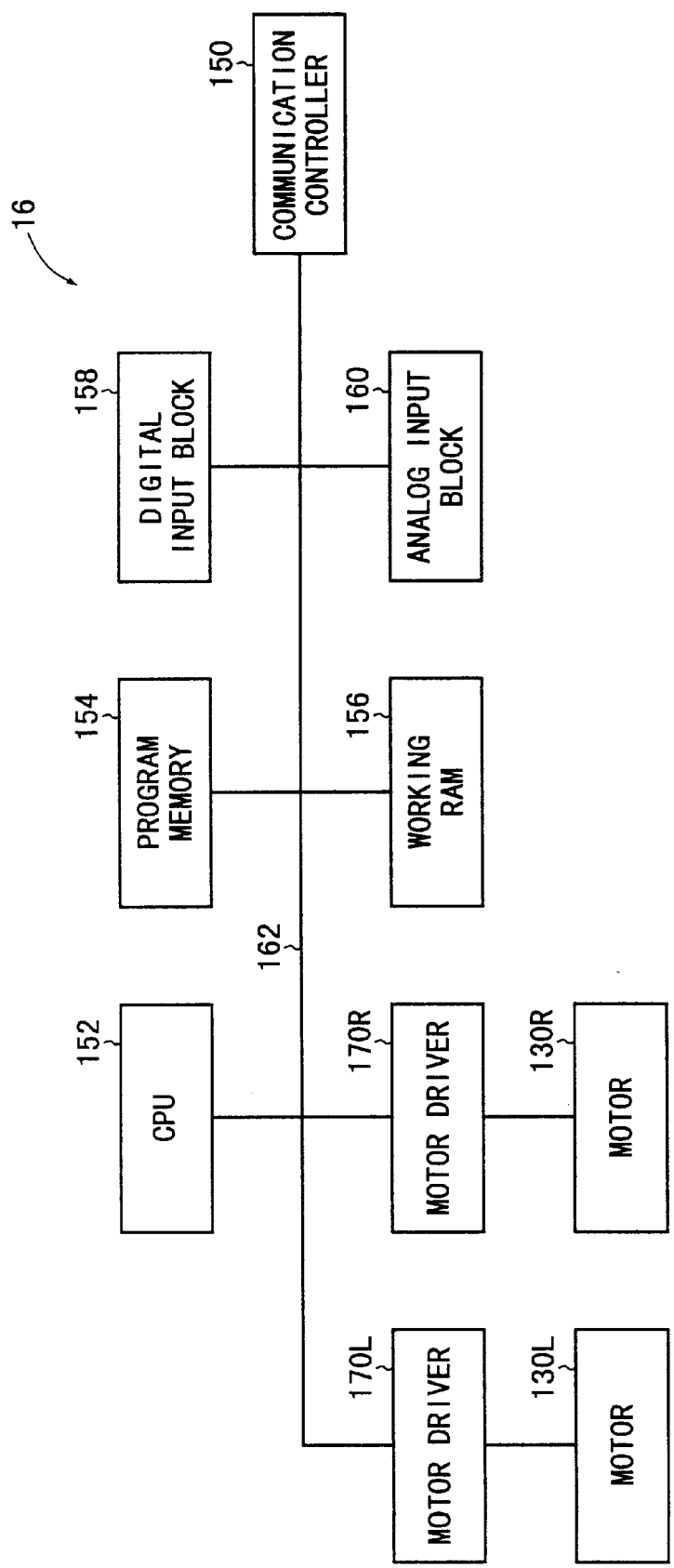
FIG. 7 is a view showing a system of the manual controller.

As shown in FIG. 7, the manual controller 16 comprises a communication controller 150, a CPU 152, a program memory 154, a working RAM 156, a digital input block 158, an analog input block 160, the left motor driver 170L, the left motor 130L, the right motor driver 170R, and the right motor 130R. These components of the manual controller 16 are connected to a bus 162.

The digital input block 158 functions as a manual input controller for the first through fourth pressable control members 110a–110d of the first control pad 34 and the first through fourth pressable control members 112a–112d of the second control pad 36. The analog input block 160 functions as a manual input controller for the left and right joysticks 44, 46. The digital input block 158 and the analog input block 160 allow the user to enter various items of information into the manual controller 16.

The communication controller 150 has a function to effect serial communications with an external device. The communication controller 150 is electrically connectable to the communication controller 90 of the entertainment apparatus 12 (see FIG. 6), for example, for data communication with the entertainment apparatus 12.

Figure 8:
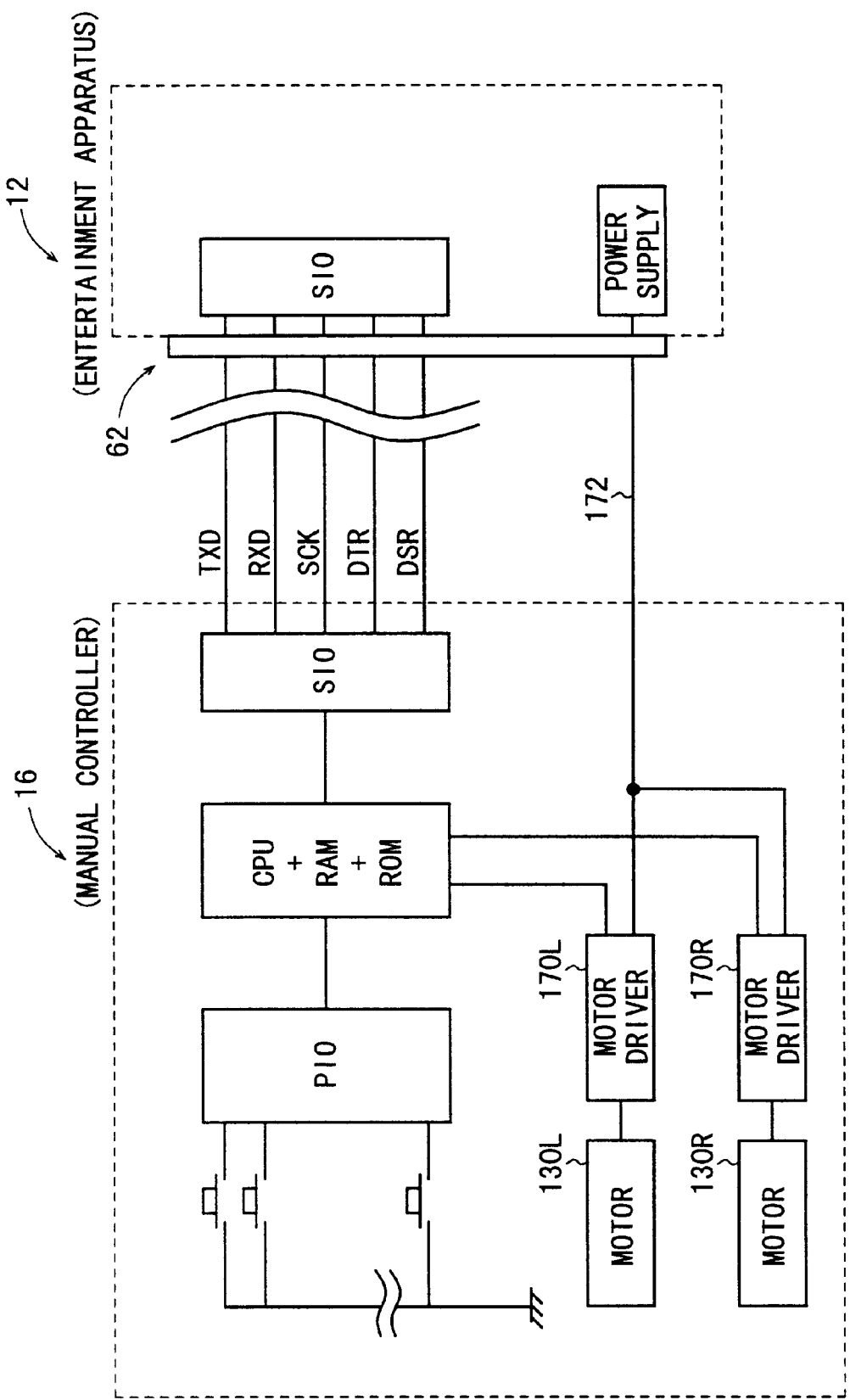
FIG. 8 is a block diagram of main components for carrying out bidirectional serial communications between the manual controller and the entertainment apparatus.

As shown in FIG. 8, the bidirectional communication function between the entertainment apparatus 12 and the manual controller 16 can be performed when the connector 62 capable of performing bidirectional serial communications with the manual controller 16 is connected to the entertainment apparatus 12.

A system in the manual controller 16 for performing the bidirectional communication function comprises a serial I/O interface SIO for performing serial communication with the entertainment apparatus 12, a parallel I/O interface PIO for entering manipulation data from a plurality of control buttons, a one-chip microcomputer comprising a CPU, a RAM, and a ROM, and motor drivers 170R, 170L for energizing the motors 130R, 130L of the vibration imparting mechanisms 128R, =128L. The motors 130R, 130L are energized for rotation by voltages and currents supplied from the corresponding motor drivers 170R, 170L.

A system in the entertainment apparatus 12 for performing the bidirectional communication function comprises a serial I/O interface SIO for performing serial communication with the manual controller 16. When the connector 62 is connected to the serial I/O interface SIO of the entertainment apparatus 12, the serial I/O interface SIO of the entertainment apparatus 12 is connected to the serial I/O interface SIO of the manual controller 16 via the connector 62 for performing bidirectional communications between the manual controller 16 and the entertainment apparatus 12. Other structural details of the entertainment apparatus 12 are omitted from illustration in FIG. 8.

Signal and control lines for bidirectional serial communications include a data transfer signal line TXD (Transmit X' for Data) for sending data from the entertainment apparatus 12 to the manual controller 16, a data transfer signal line RXD (Received X' for Data) for sending data from the manual controller 16 to the entertainment apparatus 12, a serial synchronous clock signal line SCK (Serial Clock) for extracting data from the data transfer signal lines TXD, RXD, a control line DTR (Data Terminal Ready) for establishing and cutting off communication with the manual controller 16 as a terminal, and a flow control line DSR (Data Set Ready) for transferring a large amount of data.

The signal and control lines for bidirectional serial communication are accommodated in a cable. As shown in FIG. 8, this cable further includes a power line 172 extending from a power supply in the entertainment apparatus 12 and connected to the motor drivers 170R, 170L in the manual controller 16 for supplying electric energy to energize the motors 130R, 130L.

A process of bidirectional serial communication between the manual controller 16 and the entertainment apparatus 12 will be described below. In order for the entertainment apparatus 12 to communicate with the manual controller 16 to read manipulation data from the digital input block 158 and the analog input block 160, the entertainment apparatus 12 first outputs selection data to the control line DTR. As a result, the manual controller 16 confirms that it is selected by the control line DTR, and then waits for a signal from the signal line TXD. Then, the entertainment apparatus 12 outputs an identification code indicative of the manual controller 16 to the data transfer signal line TXD. The manual controller 16 receives the identification code from the signal line TXD.

When the manual controller 16 recognizes the identification code, the manual controller 16 starts communicating with the entertainment apparatus 12. The entertainment apparatus 12 sends manipulation data via the data transfer signal line TXD to the manual controller 16, which sends the manipulation data from the digital input block 158 and the analog input block 160 to the entertainment apparatus 12 via the data transfer signal line RXD. In this manner, the entertainment apparatus 12 and the manual controller 16 perform bidirectional serial communications. The bidirectional serial communications will be finished when the entertainment apparatus 12 outputs selection stop data via the control line DTR.

With the bidirectional serial communication function, the manual controller 16 can send mainly manipulation data from the digital input block 158 and the analog input block 160 to the entertainment apparatus 12, and the entertainment apparatus 12 can send a vibration generating command for energizing the motors 130R, 130L of the vibration imparting mechanisms 128R, 128L via the data transfer signal line TXD to the manual controller 16.

The vibration generating command for energizing the motors 130R, 130L has been established in advance in the optical disk 20 set in the entertainment apparatus 12. Alternatively, the vibration generating command is generated by the entertainment apparatus 12.

Next, a characteristic function of the entertainment system 10 according to the present embodiment will be described below with reference to FIGS. 9 through 15.

The characteristic function of the entertainment system 10 is to permit a user to input manipulation data by specific manipulation of the manual controller 16 when a symbol indicating permission to input the manipulation data by the specific manipulation is displayed on the display monitor 18, and to change a predetermined parameter of a program presently executed by the entertainment apparatus 12 based on the manipulation data inputted by the specific manipulation.

A battle system of a role playing game utilizing the characteristic function of the entertainment system 10 will be described specifically.

Figure 9:
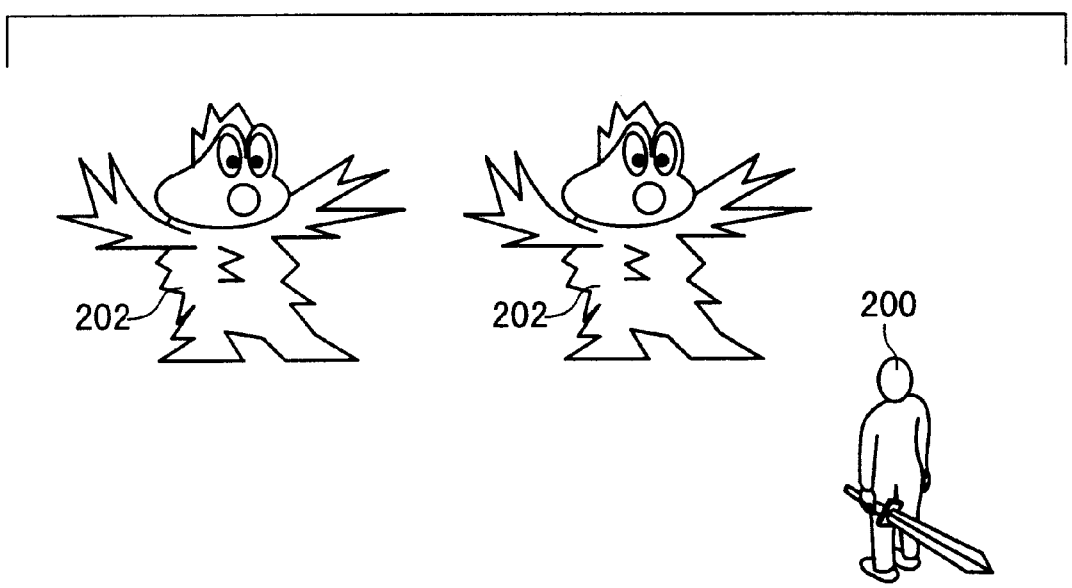
FIG. 9 is a view showing a condition in which a main character and monsters are standing face-to-face.

As shown in FIG. 9, when the user enters a battle, a main character 200 and monsters (enemies) 202 are displayed on the display monitor 18.

At this time, the user is requested to input a manipulation command for determining an action in the battle. It is to be understood that there are several types of actions such as "attack a monster with a weapon", "cast a magic spell", "defend (parry) the monster's attack" and "use an item" depending on the nature of the game.

If the user inputs a manipulation command for casting a magic spell or using an item, the user is requested to input a manipulation command for selecting a magic spell or an item. If the user selects a magic spell or a magic item for performing a magic attack, the user is requested to select one monster 202 to be targeted for attack from the monsters 202 in the battle scene. The user may be requested to select a plurality of monsters 202 depending on the level of the magic spell or the like.

Figure 10:
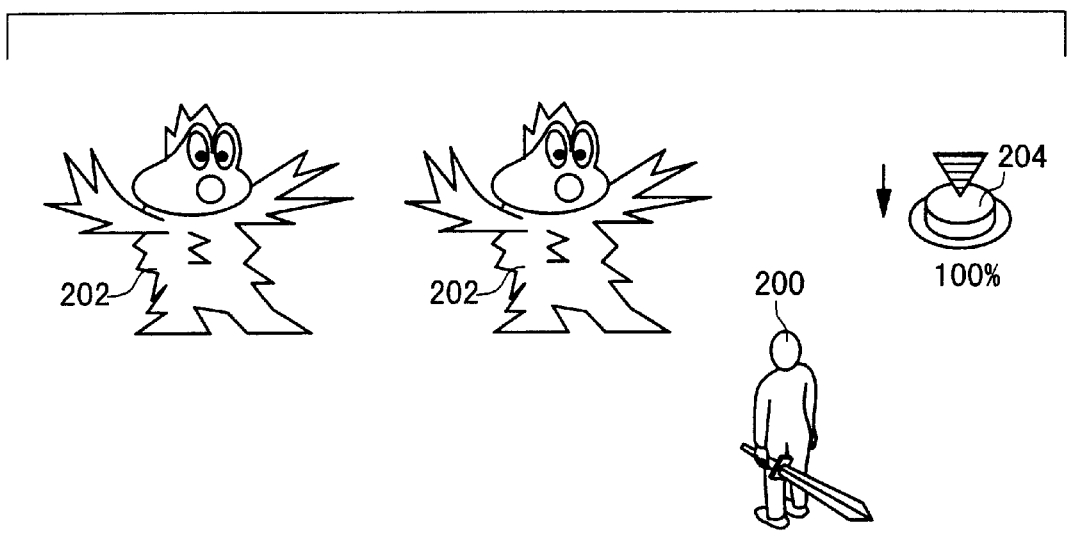
FIG. 10 is a view showing a button icon and a changing rate on the right side.

As shown in FIG. 10, when the user inputs manipulation commands for attacking one of the monsters 202 with a magic spell or a magic item, an icon 204 appears on the right side of the display monitor 18. The icon 204 moves synchronously with the manipulation of the decision button 112*d* (the icon 204 will be referred to as the "button icon"). Further, a number indicating a level of a parameter (magic power) of the selected magic spell or magic item is displayed as a power meter near the button icon 204. Specifically, the number indicates a rate for changing the parameter of the magic power of the selected magic spell or magic item. The number will be referred to as the changing rate. The degree of changing the magic power is determined by the changing rate. In FIG. 10, for example, the initial value "100%" of the parameter is shown on the display monitor 18. The value "100%" indicates the basic power of the selected magic spell or magic item.

The level for each of the graphic effect, sound effect, and vibration effect of the magic attack against the monster 202 with the selected magic spell or magic item is determined by the changing rate. The description of the graphic effect, sound effect, and vibration effect will be given later on.

Figure 11:
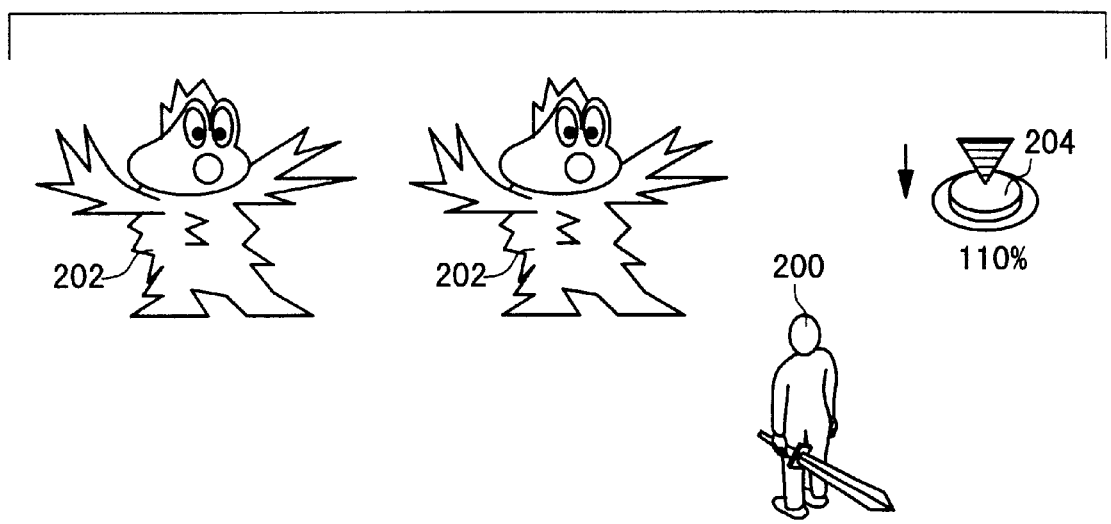
FIG. 11 is a view showing a condition in which the changing rate is accumulated based on manipulation data inputted by pressing a decision button.

While the button icon 204 is being displayed on the display monitor 18, the user is given a chance to increase the power of the selected magic spell or magic item by pressing the decision button 112*d* multiple times. Specifically, in order to increase the effect of the magic attack, it is necessary for the user to press the decision button 112*d* rapidly as many times as possible. The number of button pressings by the user is counted such that the changing rate reflects the counted number. In FIG. 11, if the user presses the decision button 112*d* five times, for example, the changing rate is increased up to 110%. If the changing rate is increased up to 200% by pressing the decision button 112*d* multiple times, the damage points of the magic attack is increased to be twice as large as the basic damage points of the magic attack.

As described above, when the button icon 204 is displayed on the monitor 18, the user can increase the changing rate of the magic power by pressing the decision button 112*d* multiple times so as to increase the damage points of the magic attack. At this time, the levels of the respective graphic effect, sound effect, and vibration effect are also increased based on the changing rate.

The graphic effect, sound effect and vibration effect of the magic attack against the monster 202 will be described briefly. There are different types of magic such as fire magic, wind magic, thunder magic, meteor magic, and poison magic. For example, the graphic effects of the fire magic, wind magic, and meteor magic can be achieved by displaying a flame, a hurricane, falling stones over the monster 202, respectively. The graphic effect of the poison magic can be achieved by displaying a poisonous gas field around the monster 202. According to the battle system of the present embodiment, different levels of the graphic effect can be achieved by the following manner. For example, in the case of the fire magic, different levels of the graphic effect can be achieved by changing the size or color of the flame over the monster 202 depending on the changing rate of the magic power of the selected magic spell or magic item. In the case of the wind magic, the size of the hurricane over the monster 202 may be changed. In the case of the meteor magic, the number or sizes of the falling stones may be changed. Further, in the case of the poison magic, the size of the poisonous gas field may be changed.

Further, different levels of the sound effect can be achieved by changing the tone or volume of the sound. For example, in the case of the fire magic, there are four levels of the sound effect. If the changing rate is low, a small frizzling sound is generated. If the changing rate is high, a large roaring sound is generated.

Different levels of the vibration effect can be achieved by changing the vibration level of the vibration imparting mechanisms 128R, 128L provided in the manual controller 16 depending on the changing rate. Further, the vibration level for vibrating images on the display monitor 18 may also be changed depending on the changing rate.

Next, an example of software (parameter changing means 300) for carrying out the characteristic function of the entertainment system 10 will be described with reference to FIGS. 12 through 15. For the purpose of brevity, the software (parameter changing means 300) will be described basically in connection with a battle between a single main character 200 and a single monster 202. However, it is to be understood that the software (parameter changing means 300) can also be applied to a battle between a plurality of main characters 200 and a plurality of monsters 202.

The parameter changing means 300 can be supplied from a randomly accessible recording medium such as a CD-ROM, a memory card 14 or the like to the entertainment apparatus 12. Alternatively, the parameter changing means 300 can be downloaded via a network such as the Internet or downloaded via a satellite communication or the like to the entertainment apparatus 12. In the following explanation, the parameter changing means 300 is supplied from an optical disk (e.g., CD-ROM) 20.

Specifically, the optical disk 20 is played back by the optical controller 88 to read the parameter changing means 300 and the read parameter changing means 300 is stored in a main memory in the control system 82 of the entertainment apparatus 12 by a predetermined process. Thereafter, the parameter changing means 300 is executed by the CPU 80 of the control system 82 of the entertainment apparatus 12.

Figure 12:
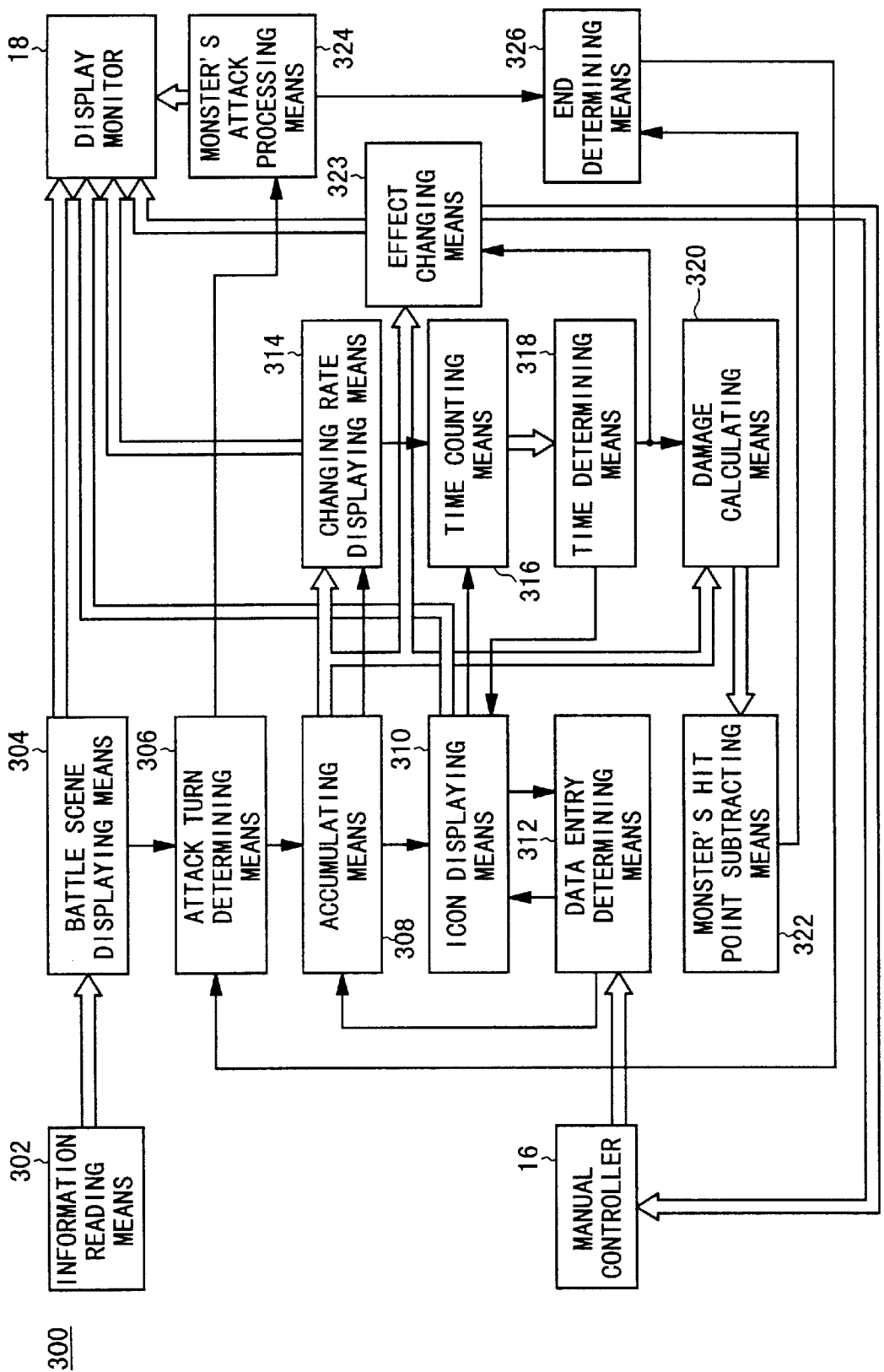
FIG. 12 is a functional block diagram showing a system of parameter changing means.

As shown in FIG. 12, the parameter changing means 300 comprises information reading means 302, battle scene displaying means 304, attack turn determining means 306, accumulating means 308, icon displaying means 310, and data entry determining means 312. The information reading means 302 reads information about the main character 200 and the monster 202 from the optical disk 20. The battle scene displaying means displays images of a background, the main character 200, and the monster 202 as a battle scene on the display monitor 18. The attack turn determining means 306 determines whether the present attack turn is for the main character 200 or the monster 202. The accumulating means 308 accumulates the changing rate (percentage points) for changing a magic power. The icon displaying means 310 displays the button icon 204 on the display monitor 18. The data entry determining means 312 determines whether the decision button 112 has been pressed or not.

Further, the parameter changing means 300 comprises changing rate displaying means 314, time counting means 316, time determining means 318, damage calculating means 320, monster's hit point subtracting means 322, effect changing means 323, monster's attack processing means 324, and end determining means 326. The changing rate displaying means 314 displays a number indicating the changing rate on the display monitor 18. The time counting means 316 starts counting time when the button icon 204 is displayed on the display monitor 18. The time counting means 316 counts time until a predetermined time has passed. The time determining means 318 determines whether the predetermined time has passed or not. The damage calculating means 320 calculates damage points by the present magic attack based on the level of the main character 200, the selected magic spell or magic item, and the changing rate. The monster's hit point subtracting means 322 subtracts damage points by the magic attack of the main character 200 from hit points of the monster 202. The effect changing means 323 changes the levels of the respective graphic effect, sound effect, and vibration effect based on the changing rate. The monster's attack processing means 324 moves the monster 202 to attack the main character 200 on the display monitor 18. Further, the monster's attack processing means 324 subtracts damage points by the monster's attack from hit points of the main character 200. The end determining means 326 determines the end/continuation of the battle.

Next, the processing sequence of the parameter changing means 300 will be described with reference to flow charts of FIGS. 13 through 15.

Figure 13:
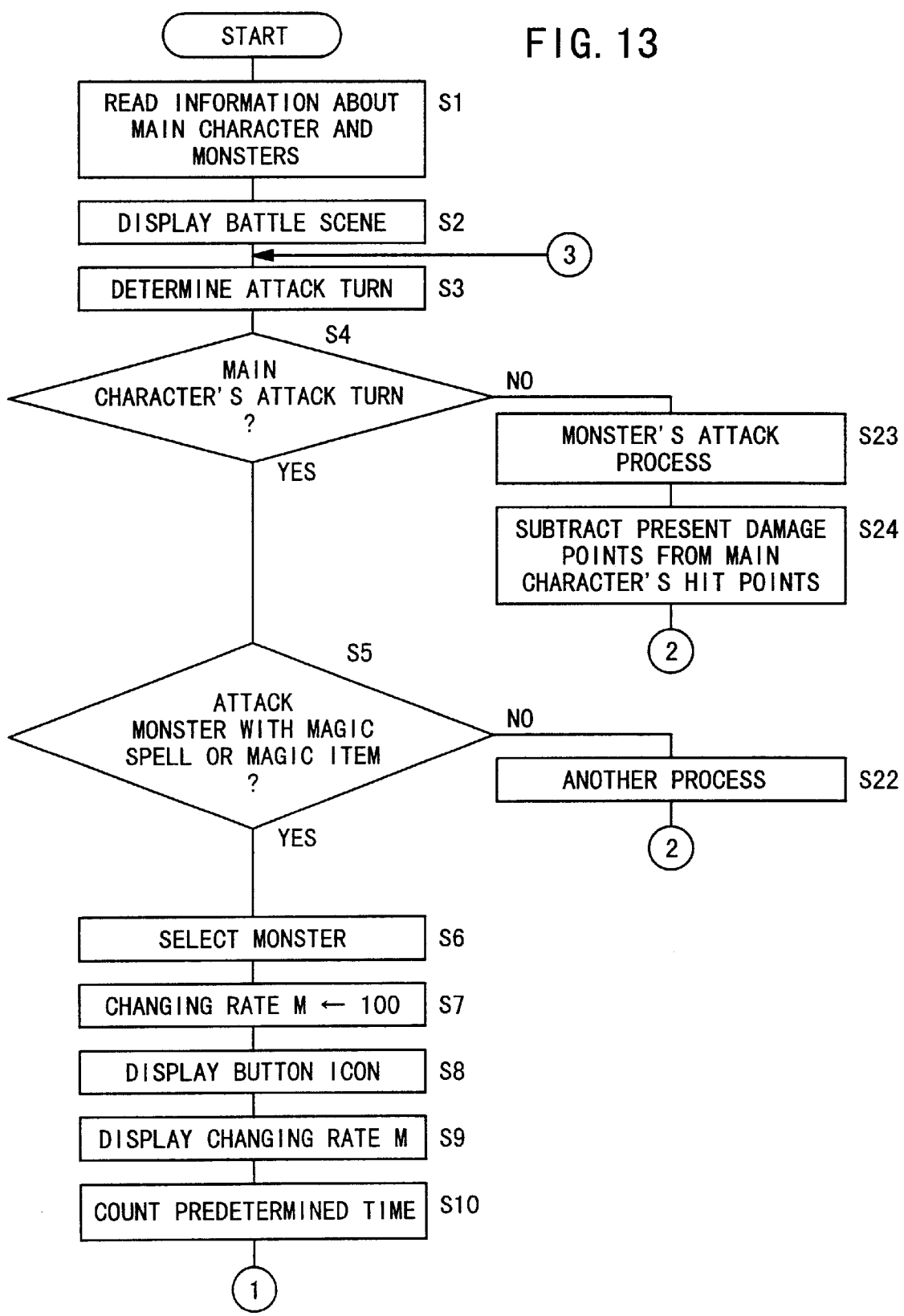
FIG. 13 is a flow chart (No. 1) showing a processing sequence of the parameter changing means.

Firstly, as shown in Step S1 of FIG. 13, the information reading means 302 reads information about the main character 200 and the monster(s) 202 from the optical disk 20.

Next, in Step S2, the battle scene displaying means 304 displays images of a background, the main character 200, and the monster(s) 202 as a battle scene on the display monitor 18. Then, the control goes to Step S3. In Step S3, the attack turn determining means 306 determines the attack turn. The attack turn may be determined based on a random number. Alternatively, the attack turn may be determined by a predetermined order (e.g., first turn: main character→second turn: monster→third turn: main character).

If the attack turn determining means 306 determines that the present attack turn is for the main character 200 in Step S4, the control goes to Step S5 for determining the action of the main character 200. If it is determined that manipulation commands for attacking a monster 202 with a magic spell or a magic item are inputted by the user via the manual controller 18, the control goes to Step S6. In Step S6, a monster 202 to be targeted for the magic attack is selected from the monsters 202 in the battle scene.

Then, in Step S7, the accumulating means 308 initializes a register M used for updating information of the changing rate (percentage points) by storing an initial value 100 in the register M.

Next, in Step S8, as shown in FIG. 10, the icon displaying means 310 displays the button icon 204 on the right side of the display monitor 18. In Step S9, the changing rate displaying means 314 displays the present changing rate near the button icon 204. In FIG. 10, a percentage value "100%" is displayed as the changing rate on the display monitor 18. Further, in Step S10, the time counting means 316 starts counting time. The time counting means 316 counts time until a predetermined time has passed.

Figure 14:
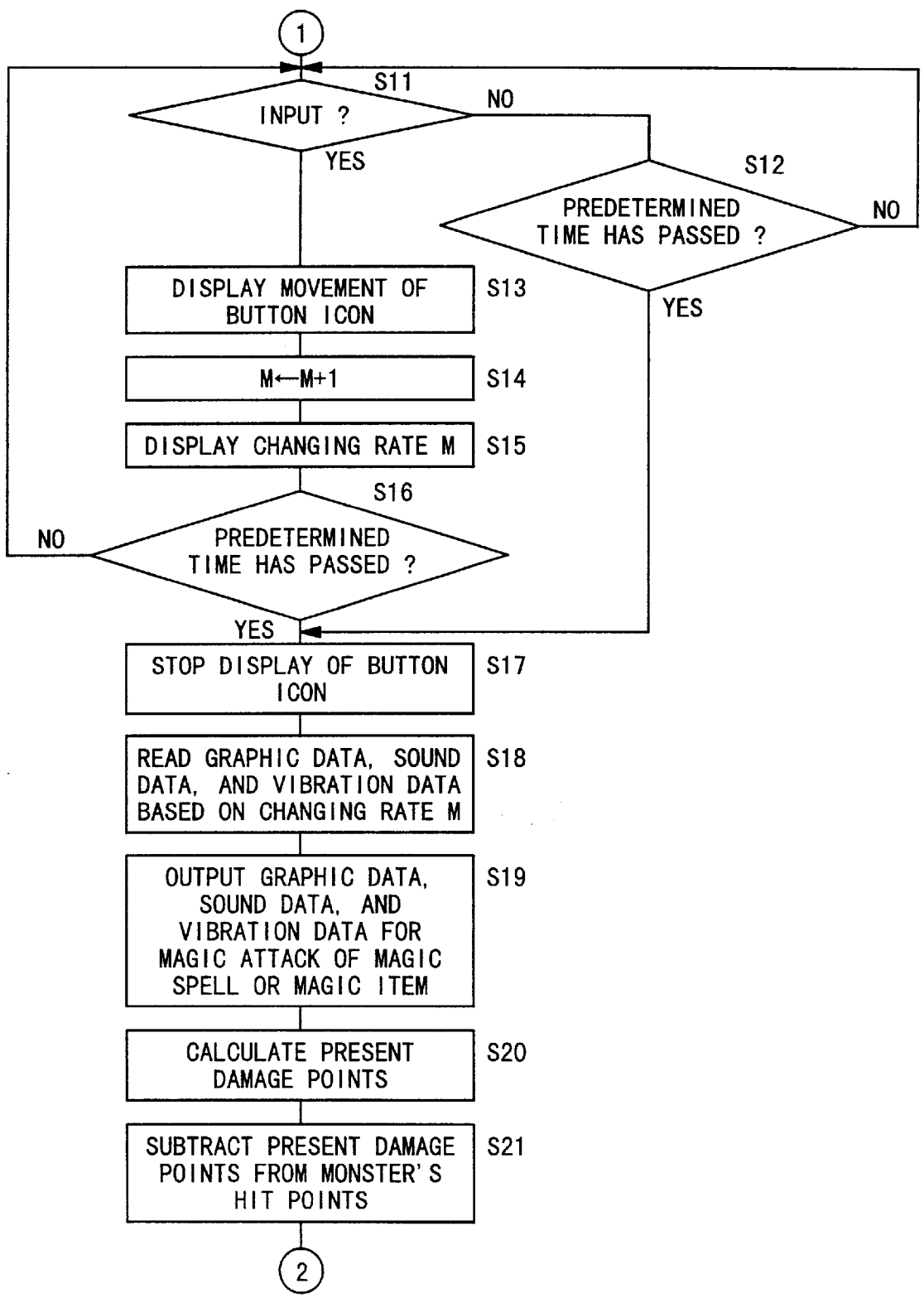
FIG. 14 is a flow chart (No. 2) showing a processing sequence of the parameter changing means.

Then, in Step S11 of FIG. 14, the data entry determining means 312 determines whether the decision button 112d has been pressed by the user or not. If it is determined that the decision button 112d has not been pressed by the user in Step S11, the control goes to Step S12. In Step S12, the time determining means 318 determines that whether the predetermined time has passed or not.

If it is determined that the predetermined time has passed in Step S12, that is, if it is determined that the decision button 112d has not been pressed for the predetermined time, the control goes to Step S17. If it is determined that the predetermined time has not passed in Step S12, the control goes back to Step S11.

If it is determined that the decision button 112d has been pressed in Step S11, that is, if it is determined that the decision button 112d has been pressed within the predetermined time, the control goes to Step S13. In Step S13, the icon displaying means 310 displays the button icon 204 on the display monitor 18 such that the button icon 204 is pressed synchronously with the manipulation of the decision button 112d by the user.

Then, in Step S14, the accumulating means 308 accumulates the changing rate (percentage points) for changing the magic power. Specifically, the accumulating means 308 updates the value of register M to be incremented by 1. Thereafter, in Step S15, the icon displaying means 310 displays the present changing rate near the button icon 204.

Next, in Step S16, the time determining means 318 determines that whether the predetermined time has passed or not. If it is determined that the predetermined time has not passed, the control goes back to Step S11 for determining whether the decision button 112 has been pressed again by the user or not.

If it is determined that the predetermined has passed in Step S16, the control goes to Step S17. In Step S17, the icon displaying means 318 stops the display of the button icon 204. Then, the control goes to Step S18.

In Step S18, the effect changing means 323 reads graphic data, sound data, and vibration data from the optical disk 20 for performing the magic attack of the selected magic spell or magic item. In this case, different levels of graphic data, sound data, and vibration data are stored in the optical disk 20 for achieving different levels of the graphic effect, sound effect and vibration effect. The respective levels of the graphic data, sound data, vibration data read by the effect changing means 323 are determined by the level of the selected magic spell or magic item, and the changing rate of the magic power.

Then, in Step S19, the effect changing means 323 outputs the read graphic data and sound data via the display monitor 18. Further, the effect changing means 323 outputs the read vibration data via the vibration imparting mechanisms 128L, 128R of the manual controller 16. In this manner, the graphic, sound and vibration for the present magic attack of the selected magic spell or magic item can be generated based on the changing rate.

Then, in Step S20, the damage calculating means 320 calculates damage points of the present magic attack. According to the battle system of the present embodiment, the damage calculating means 320 calculates the damage points of the magic attack based on a predetermined damage points determined by the level of the main character 200, the selected type or level of the magic spell or magic item, and the changing rate. Then, the control goes to Step S21.

In Step S21, the monster's hit point subtracting means 322 subtracts the calculated damage points by the magic attack of the main character 200 from hit points of the monster 202.

In Step S5 of FIG. 13, if it is determined that the manipulation command inputted by the user is not a command for attacking the monster 202 with a magic spell or a magic item, that is, if it is determined that the manipulation command inputted by the user is a command for attacking the monster 202 with a weapon or a command for using a non-magic item, the control goes to Step S22 for performing another process depending on the type of the command.

In Step S4 of FIG. 13, if the attack turn determining means 306 determines that the present attack turn is for the monster 202, the control goes to Step S23 for performing the process of the monster's attack processing means 324. In Step 23, the monster's attack processing means 324 moves the monster 202 to attack the main character 200 on the display monitor 18. Then, in Step S24, the monster's attack processing means 324 subtracts damage points by the monster's attack from hit points of the main character 200.

Figure 15:
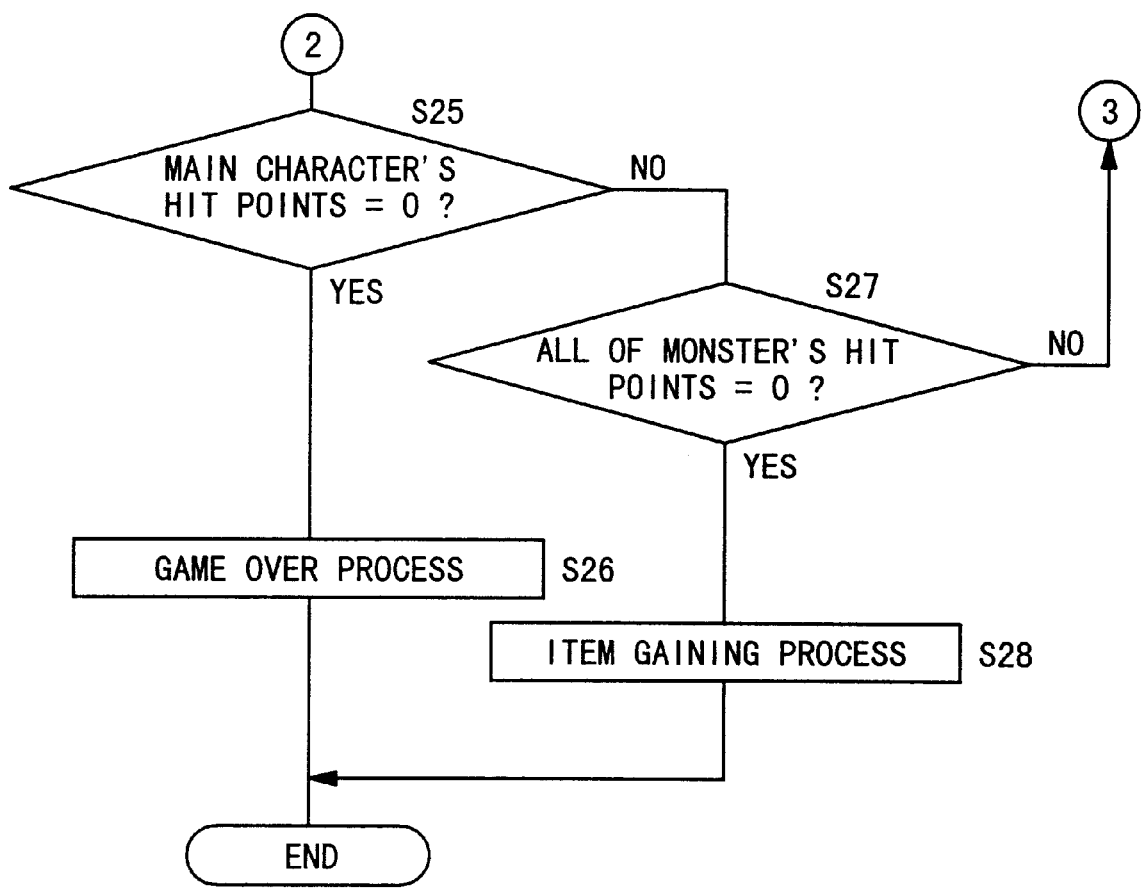
FIG. 15 is a flow chart (No. 3) showing a processing sequence of the parameter changing means.

When any one of the process in Step S21 of FIG. 14, the process in Step S22 and the process in Step S24 of FIG. 13 is finished, the control goes to Step S25 of FIG. 15.

In Step S25, the end determining means 326 determines whether the value of the main character's hit points is "0" or not.

If it is determined that the value of the main character's hit points is "0", the control goes to Step S26 for performing the process of "Game Over". Then, the process of the parameter changing means 300 is brought to an end.

If it is determined that the value of the main character's hit points is not "0", the control goes to Step S27 for determining whether the value of the monster's hit points is "0" or not for each of the monsters 202. If it is determined that the value of the monster's hit points is not "0" for any of the monsters 202, the control goes back to Step S3 and the subsequent steps for performing the next attack turn for the main character 200 or the monsters 202. If it is determined that the value of monster's hit points is "0" for every monster 202, the control goes to Step S28. In Step S28, the process of gaining items, gold and experiences by the main character 200 is performed. Then, process of the parameter changing means 300 is brought to an end.

As described above, according to the embodiment of the present invention, the entertainment system 10 comprises the parameter changing means 300 for permitting a user to input manipulation data by successively pressing the decision button 112d of the manual controller 16 while the button icon 204 is being displayed on the display monitor 18. Based on the manipulation data, the parameter changing means 300 changes a predetermined parameter of a program presently executed by the entertainment apparatus 12 such as a parameter for damage points of the monster 202, a parameter for a graphic effect, a parameter for a sound effect, and a parameter for a vibration effect, with respect to the magic attack of a magic spell or a magic item.

For example, in a conventional battle scene of a role playing game, when a user tries to attack a monster 202 with a magic spell or a magic item, a predetermined animation for the selected magic spell or magic item is displayed on the display monitor 18. Then, predetermined damage points by the magic spell or magic item are subtracted from hit points of the monster 202. In this case, since it is not possible for the user to input data or commands via the manual controller 18 during the animation of the magic attack, the user can only passively view the progress of the animation. Therefore, the user can not feel actively participating in the battle. Consequently, the battle scene tends to be monotonous.

However, according to the present embodiment, the user is permitted to input specific manipulation data via the manual controller 16 (for example, the user can input manipulation data by pressing the decision button 112d successively) for changing damage points by the main character's attack against the monster 202 and changing the effects of the magic attack such as the graphic effect, sound effect, and vibration effect. Thus, it is possible for the user to actively participate in the battle. Accordingly, a further amusing aspect can be added to the role playing game.

That is, according to the present embodiment, it is possible to reflect manipulation data inputted by specific manipulation of the user on the effects of the magic spell or magic item in the battle scene of the role playing game. Therefore, it is possible to prevent the user from losing interest in the game.

Though the parameter changing means 300 has been described in connection with a battle scene of a role playing game, it is to be understood that the parameter changing means 300 can be applicable to a shooting game, a fighting game or the like.

The entertainment system, the entertainment apparatus, and the recording medium, and the program shall not be limited to the particular embodiment disclosed herein. It will be apparent to a person skilled in the art that numerous modifications and variation may be made without departing from the spirit and scope of the invention.

What is claimed is:

1. An entertainment system comprising:

an entertainment apparatus for executing various programs;

at least one manual controller for inputting a manual control request of a user to said entertainment apparatus;

a display monitor for displaying an image outputted from said entertainment apparatus; and parameter changing means for permitting the user to input manipulation date by specific manipulation of said manual controller when a symbol indicating permission to input the manipulation data by said specific manipulation is displayed on said display monitor in a role playing game, and for changing a predetermined parameter of a program presently executed by said entertainment apparatus based on the manipulation data inputted by said specific manipulation.

2. An entertainment system according to claim 1, wherein
said specific manipulation is performed by successively manipulating a predetermined control member multiple times;
said parameter changing means comprises data entry counting means for counting the number of times said predetermined control member is manipulated for inputting the manipulation data when said symbol is displayed on said display monitor; and
said parameter changing means changes said parameter based on the counted number of times said predetermined control member is manipulated for inputting the manipulation data.

3. An entertainment system according to claim 1, wherein said parameter changing means comprises parameter displaying means for displaying a change of said parameter near said symbol on said display monitor.

4. An entertainment system according to claim 1, wherein said parameter indicates an effect of the user's action on a virtual enemy displayed on said display monitor in a battle scene.

5. An entertainment system according to claim 4, wherein said parameter changing means comprises:
symbol displaying means for displaying said symbol on said display monitor for a predetermined period of time;
data entry counting means for counting the number of times said predetermined control member is manipulated for inputting the manipulation data when said symbol is displayed on said display monitor; and
influence changing means for changing said effect of the user's action on said virtual enemy based on the counted number of times said predetermined control member is manipulated for inputting the manipulation data.

6. An entertainment apparatus for executing various programs, said entertainment apparatus being connectable to at least one manual controller for inputting a manual control request of a user to said entertainment apparatus, and connectable to a display monitor for displaying an image outputted from said entertainment apparatus,
wherein said entertainment apparatus comprises parameter changing means for permitting the user to input manipulation data by specific manipulation of said manual controller when a symbol indicating permission to input the manipulation data by said specific manipulation is displayed on said display monitor in a role playing game, and for changing a predetermined parameter of a program presently executed by said entertainment apparatus based on the manipulation data inputted by said specific manipulation.

7. A recording medium for storing a program and data for use of an entertainment system, said entertainment system comprising:
an entertainment apparatus for executing various programs;
at least one manual controller for inputting a manual control request of a user to said entertainment apparatus; and
a display monitor for displaying an image outputted from said entertainment apparatus;
wherein said program comprises means for changing a parameter comprising:
means for permitting the user to input manipulation data by specific manipulation of said manual controller when a symbol indicating permission to input the manipulation data by said specific manipulation is displayed on said display monitor in a role playing game; and
means for changing a predetermined parameter of a program presently executed by said entertainment apparatus based on the manipulation data inputted by said specific manipulation.

8. A recording medium according to claim 7, wherein
said specific manipulation is performed by successively manipulating a predetermined control member multiple times, and
said means for changing said parameter comprises:
means for counting the number of times said predetermined control member is manipulated for inputting the manipulation data when said symbol is displayed on said display monitor, and changing said parameter based on the counted number of times said predetermined control member is manipulated for inputting the manipulation data.

9. A recording medium according to claim 7, wherein said means for changing said parameter comprises means for of displaying a change of said parameter near said symbol on said display monitor.

10. A recording medium according to claim 7, wherein said parameter indicates an effect of the user's action on a virtual enemy displayed on said display monitor in a battle scene.

11. A recording medium according to claim 10, wherein said means for changing said parameter comprises the step of:
means for displaying said symbol for a predetermined period time;
means for counting the number of items said predetermined control member is manipulated for inputting the manipulation data when said symbol is displayed on said display monitor; and
means for changing said effect of the user's action on said virtual enemy based on the counted number of times said predetermined control member is manipulated for inputting the manipulation data.

12. A program readable and executable by a computer, said computer being for use of an entertainment system comprising:
an entertainment apparatus for executing various programs;
at least one manual controller for inputting a manual control request of a user to said entertainment apparatus; and
a display monitor for displaying an image outputted from said entertainment apparatus;
wherein said program comprises:
means for permitting the user to input manipulation data by specific manipulation of said manual controller when a symbol indicating permission to input the manipulation data by said specific manipulation is displayed on said display monitor in a role playing game; and
means for changing a predetermined parameter of a program presently executed by said entertainment apparatus based on the manipulation data inputted by said specific manipulation.

13. An image processor for use of an entertainment apparatus, comprising:

means for displaying a symbol for a predetermined periods of time on a display monitor in a role playing game;

means for determining an effect of the user's action based on manipulation data inputted by a user when said symbol is displayed on said display monitor;

means for generating an image according to said effect of the user's action; and means for outputting an image to said display monitor.

14. An image processing method comprising the steps of:

displaying a symbol for a predetermined period of time on a display monitor in a role playing game;

determining an effect of the user's action based on manipulation data inputted by a user when said symbol is displayed on said display monitor;

generating an image according to said effect of the user's action; and outputting an image to said display monitor.

* * * * *